(12) United States Patent
DeBo et al.

(10) Patent No.: US 10,296,495 B1
(45) Date of Patent: *May 21, 2019

(54) AUTOMATED GOVERNANCE OF DATA APPLICATIONS

(71) Applicant: STATE FARM MUTUAL AUTOMOBILE INSURANCE COMPANY, Bloomington, IL (US)

(72) Inventors: Gregory James DeBo, Normal, IL (US); Vaidya Balasubramanian Pillai, Springfield, IL (US); Randy Reiff, Bloomington, IL (US); Mary Jane Sheley, Lincoln, IL (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 330 days.

This patent is subject to a terminal disclaimer.

(21) Appl. No.: 15/226,993

(22) Filed: Aug. 3, 2016

Related U.S. Application Data

(63) Continuation of application No. 14/483,553, filed on Sep. 11, 2014, now Pat. No. 9,465,778.

(51) Int. Cl.
*G06F 17/30* (2006.01)
*G06F 16/21* (2019.01)
*G06F 11/34* (2006.01)
*G06F 11/30* (2006.01)

(52) U.S. Cl.
CPC .......... *G06F 16/21* (2019.01); *G06F 11/3034* (2013.01); *G06F 11/3409* (2013.01)

(58) Field of Classification Search
CPC ...................... G06F 17/30289; G06F 11/3409

USPC ......................................................... 707/694
See application file for complete search history.

(56) References Cited

U.S. PATENT DOCUMENTS

| 7,703,123 B2 * | 4/2010 | Vail ........................ G06Q 10/10 705/64 |
| 2002/0049740 A1 * | 4/2002 | Arning ............... G06F 17/30705 |
| 2005/0216749 A1 * | 9/2005 | Brent ....................... G06F 21/56 713/188 |
| 2007/0171288 A1 * | 7/2007 | Inoue .................... G06T 1/0064 348/241 |

OTHER PUBLICATIONS

Sharon Dooley, "SQL Server 2008 Policy-Based Management", Jun. 2009, 55 pages.

* cited by examiner

*Primary Examiner* — Sheree N Brown
(74) *Attorney, Agent, or Firm* — Marshall, Gerstein & Borun LLP; Randall G. Rueth

(57) ABSTRACT

A method for regulating a plurality of collections of data includes, for each of a plurality of collections of data, analyzing the collection of data to identify one or more deviations from a standard, guideline, or best practice governing the plurality of collections of data. The method further includes determining a characteristic of the one or more deviations and, based on the characteristic, determining an action to be executed in response to the one or more deviations.

13 Claims, 6 Drawing Sheets

Database - Best Practices, Guidelines, and Standards

- Prefer automatic storage to DMS tables spaces.
- Use CIO or DIO in table spaces.
- Use table spaces with 8KB or 16KB page sizes.
- Create additional buffer pools for each page size used in table spaces.
- Explicitly set the size of buffer pools.
- Use a numeric data type over a character data type.
- Store data definitions as a domain value in a data modeling tool.
- Use range-clustered tables for tightly clustered data.
- Use table partitioning to logically organize tables.
- Partition tables with large-scale data by both range partitioning and multidimensional clustering.
- Use columns that best match with the most frequent used queries as index keys.
- Use partitioned indexes for partitioned tables.
- Create clustered index on columns that have range predicates.
- Eliminate indexes that are never accessed.
- Use archive logging in production environments.
- Use data and index compression.
- Keep index compression enabled
- Use value compression in tables with many column values equal to the system default values or NULL.
- ...
- ...
- ...

200 

AUTOMATED GOVERNANCE OF DATA APPLICATIONS

CROSS-REFERENCE TO RELATED APPLICATION

This is a continuation of U.S. patent application Ser. No. 14/483,553, entitled "Automated Governance of Data Applications" and filed on Sep. 11, 2014, the entire disclosure of which is hereby incorporated herein by reference.

TECHNICAL FIELD

The present disclosure generally relates to the enforcement of guidelines, standards, and best practices for software applications and, more particularly, to a method for automatically enforcing, implementing, and correcting deviations from database guidelines, standards, and best practices.

BACKGROUND

Databases or other software applications that fail to adhere to guidelines and best practices pose a threat to the stability and availability of systems implementing those applications. For example, a database application, such as an application utilizing DB2® Database Software, might support a customer-facing web interface requiring the database application to maintain constant availability, such as in the case of ecommerce, insurance claim processing, technical support, cloud service, etc. interfaces. When such an application or system implementing the application becomes unavailable, a company can lose significant amounts of money in a short period of times (e.g., $800,000/hour or more).

Manually monitoring and enforcing standards, guidelines and best practices across all systems and applications operated by a company is very expensive and time consuming. As a result, many administrators or managers of enterprise applications/systems rely on random checks of data or system logs to ensure adherence to standards (e.g., after noticing problems in a production environment). This checking might identify some deviations from standards, guidelines, and best practices, but many costly problems can still occur due to the retroactive and unfocused nature of this solution.

SUMMARY

In one embodiment, a computer-implemented method for regulating collections of data comprises, for each of the plurality of collections of data, analyzing, by one or more processors executing a plurality of deviation detection scripts, the collection of data to identify one or more deviations corresponding to ways in which the collection of data deviates from a standard governing the plurality of collections of data. Analyzing the collection of data to identify one or more deviations includes at least one of (i) detecting that an amount of data associated with a table space in the collection of data surpasses a threshold, (ii) detecting that data within the collection of data lacks an image copy, (iii) detecting that data within the collection of data is associated with an outdated image copy, or (iv) detecting that index keys associated with data within the collection do not conform to the standard. The method also includes automatically determining, by the one or more processors, a characteristic of the one or more deviations indicating at least one of: (i) a similarity of the one or more deviations to a past deviation of the collection of data from the standard governing the plurality of collections of data, (ii) a consequence of altering the collection of data to correct the one or more deviations, or (iii) a threat level corresponding to the one or more deviations. The method also includes, based on the characteristic of the one or more deviations, automatically determining, by the one or more processors, an action to be executed in response to the one or more deviations, and causing, by the one or more processors, the action to be executed.

In another embodiment, a system includes one or more processors and a non-transitory computer-readable medium storing instructions thereon. The instructions, when executed by the one or more processors, cause the system to, for each of the plurality of collections of data: (1) analyze the collection of data using a plurality of deviation detection scripts to identify one or more deviations corresponding to ways in which the collection of data deviates from a standard governing the plurality of collections of data, at least by one or more of (i) detecting that an amount of data associated with a table space in the collection of data surpasses a threshold, (ii) detecting that data within the collection of data lacks an image copy, or (iii) detecting that data within the collection of data is associated with an outdated image copy; (2) determine a characteristic of the one or more deviations indicating at least one of: (i) a similarity of the one or more deviations to a past deviation in the collection of data from the standard governing the plurality of collections of data, (ii) a consequence of altering the collection of data to correct the one or more deviations, or (iii) a threat level corresponding to the one or more deviations; (3) based on the characteristic of the one or more deviations, determine an action to be executed in response to the one or more deviations; and (4) cause the action to be executed.

In yet another embodiment, a non-transitory, computer-readable medium stores instructions that, when executed by one or more processors, cause the one or more processors to, for each of a plurality of collections of data: (1) analyze the collection of data using a plurality of deviation detection scripts to identify one or more deviations corresponding to ways in which the collection of data deviates from a standard governing the plurality of collections of data, at least by one or more of (i) detecting that an amount of data associated with a table space in the collection of data surpasses a threshold, (ii) detecting that data within the collection of data lacks an image copy, or (iii) detecting that data within the collection of data is associated with an outdated image copy; (2) determine a characteristic of the one or more deviations indicating at least one of: (i) a similarity of the one or more deviations to a past deviation in the collection of data from the standard governing the plurality of collections of data, (ii) a consequence of altering the collection of data to correct the one or more deviations, or (iii) a threat level corresponding to the one or more deviations; (3) based on the characteristic of the one or more deviations, determine an action to be executed in response to the one or more deviations; and (4) cause the action to be executed.

BRIEF DESCRIPTION OF THE DRAWINGS

FIG. 2 is a list of example guidelines, standards, and best practices according to which the computing environment illustrated in FIG. 1 can govern a plurality of collections of data;

DETAILED DESCRIPTION

Figure 1:
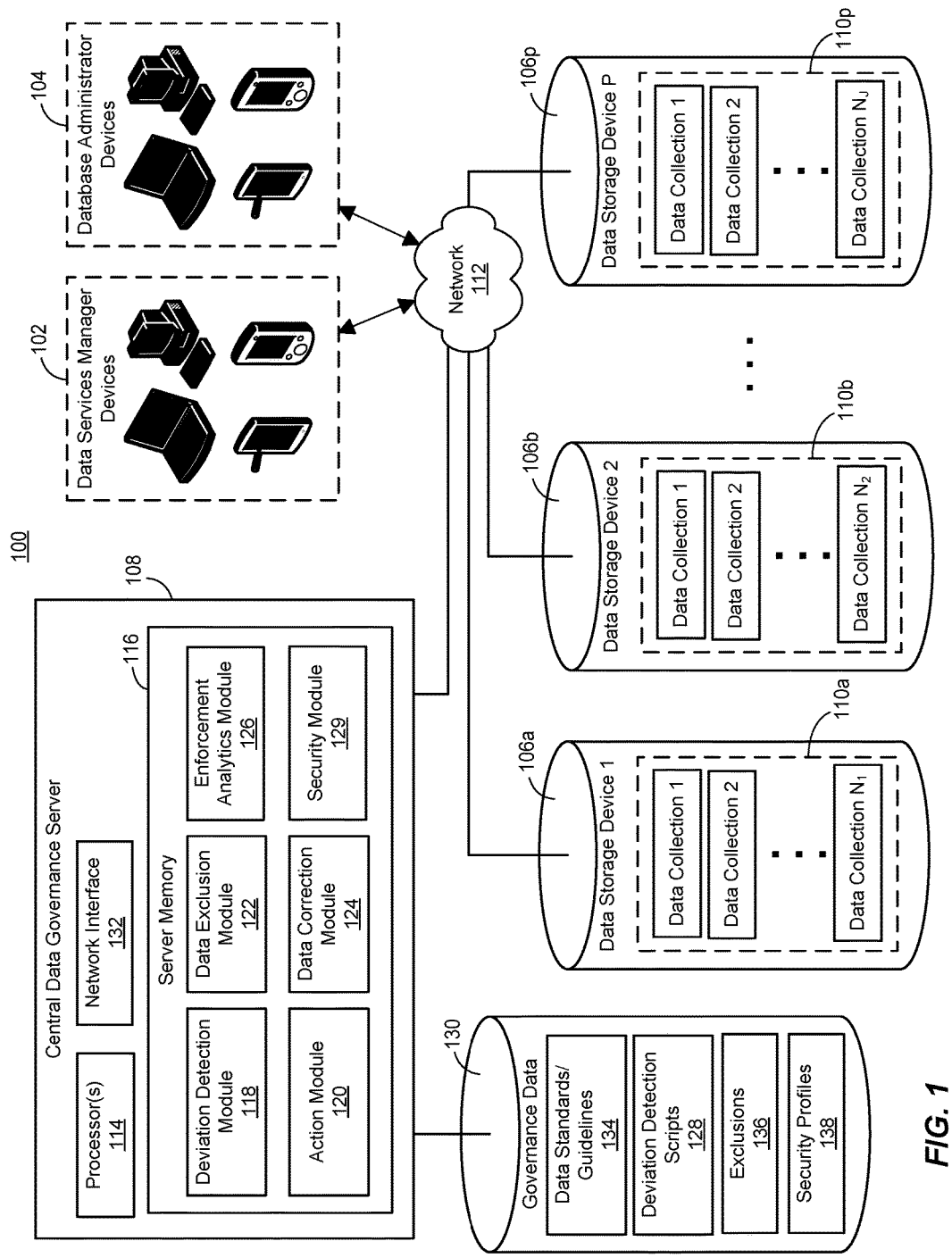
FIG. 1 is a block diagram of an example computing environment for automatically governing a plurality of collections of data according to guidelines, standards, and best practices.

Although the following text sets forth a detailed description of numerous different embodiments, it should be understood that the legal scope of the description is defined by the words of the claims set forth at the end of this disclosure. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such terms should not be interpreted to be limited in scope based on any statement made in any section of this patent (other than the language of the claims). To the extent that any term recited in the claims at the end of this patent is referred to in this patent in a manner consistent with a single meaning, that is done for the sake of clarity only so as to not confuse the reader, and it is not intended that such claim term be limited, by implication or otherwise, to that single meaning. Finally, unless a claim element is defined by reciting the word "means" and a function without the recital of any structure, it is not intended that the scope of any claim element be interpreted based on the application of 35 U.S.C. § 112, sixth paragraph.

As used herein, the terms "guidelines," "best practices," and "standards" are hereby defined to mean any of a number of rules, principles, pieces of advice, proven methods or techniques, requirements, norms, etc. related to software applications and computing systems. Guidelines, best practices, and standards may include database best practices, best coding practices, company-specific application guidelines or standards, formats or standards of data transfer, software protocols, image or graphics rendering standards, etc. Also as used herein, the terms "deviation" is hereby defined to mean any of a number of deliberate or accidental divergences from one or more guidelines, standards, or best practices. Deviations may include a misuse of a software application, a storage of data that does adhere to standards, a use of data that does not adhere to standards, etc.

Although database applications and data stored in databases are emphasized below, some implementations of the systems and methods discussed herein may facilitate the automated governance of any number of software applications other than database applications. For example, the techniques of the present disclosure may allow the automated governance of software applications related to ecommerce, billing, content management, information technology (IT), customer relationship management, marketing, analytics, project management, manufacturing, process control, procurement, social collaboration, data warehousing, facilities management, security, mobile applications, visualization, infrastructure management, etc.

System Overview

FIG. 1 illustrates an example computing environment 100 for automated governance of databases, or other software applications. The examples computing environment 100 includes one or more data services manager devices 102, one or more database administrator devices 104, one or more data storage devices 106a-106p, and a central data governance server 108. In an implementation, the central data governance server 108 may manage, govern, or regulate a plurality collections of data 110a-110p stored on the data storage devices 106a-106p (e.g., in a distributed or otherwise segmented manner) including taking certain actions upon deviations of the collections of data 110a-110p from standards, guidelines, and best practices. The actions may include, among other things, communications with the data services manager devices 102 and the database administrator devices 104 and/or automatic alterations of the collections of data 110a-110 p.

In some implementations, the central data governance server 108 may be disposed at a physical location different from the physical location of each of the data storage devices 106a-106p. Further, each of the data storage devices 106a-106p may be disposed at a different physical location than any other of the data storage devices 106a-106p, or some or all of the data storage devices 106a-106p may be disposed at the same physical location. For example, the data storage devices 106a-106p may be disposed at a plurality of data centers across the United States or even across the world. In any event, the central data governance server 108 can access (execute scripts on, alter data stored on, etc.) each of the data storage devices 106a-106p via a network 112. Thus, the central data governance server 108 allows the data storage devices 106a-106p to be managed, governed, or regulated from a central location (e.g., that of the central data governance server 108) without a need for separate servers to manage, govern, or regulate each of the data storage devices 106a-106p. Although, a certain number P data storage devices are illustrated in FIG. 1, a computing environment for automated governance of databases, or other software applications, may include any suitable number of data storage devices each storing any suitable number of data collections.

The data services manager devices 102 may include any suitable mobile or stationary computing devices such as smartphones, tablet computers, laptop computers, desktop computers, personal digital assistants, smartwatches, head-mounted computing devices, etc. Operators of the data services manager devices 102 may include individuals (e.g., employees of a company) tasked with the management of a variety of database applications, for example. The central data governance server 108 may report deviations from and adherence to database standards, guidelines, and best practices to operators of the data services manager devices 102 via user interfaces (touchscreens, displays, etc.) of the data services manager devices 102, in an implementation. Further, operators of the data services manager devices 102 may, in some cases, interact directly with the central data governance server 108 to modify, add, or remove standards, guidelines, and best practices. Additionally, operators of the data services manager devices 102 may interact directly with the central data governance server 108 to modify, monitor, or interact with applications/modules executing on the central data governance server 108 or data accessible through the central data governance server 108 (e.g., the collections of data 110a-110p).

The database administrator devices 104 may include devices substantially similar to those included in the data services manager devices 102. Operators of the database administrator devices 104 may include individuals responsible for administering, creating, manipulating, running code utilizing, or otherwise "touching" one or more of the collections of data 110a-110p. That is, an operator of one of the database administrator devices 104 may include one or more individuals that "own," are responsible for, or are primarily associated with one of the collections of data 110a-110p. The central data governance server 108 may report deviations from standards, guidelines, and best practices and actions taken as a result of those deviations to operators of the database administrator devices 104 via user interfaces (touchscreens, displays, etc.) of the database administrator devices 104, in an implementation. The database administrator devices 104 may also directly interact with the central data governance server 108 to request exclusions for certain data in the collections of data 110a-110p, modify data in the collections of data 110a-110p, etc., as further discussed with reference to FIG. 6.

The data services manager devices 102 and the database administrator devices 104 may communicate with the central data governance server 108 via the network 112. The network 112 may be a proprietary network, a secure public Internet, a virtual private network or some other type of network, such as dedicated access lines, plain ordinary telephone lines, satellite links, combinations of these, etc. Where the network 112 comprises the Internet, data communication may take place over the network 112 via an Internet communication protocol. The network 112 may communicate with the network-enabled devices 112 through wireless or wired connections. Further, in some examples, the network 112 is a mobile (or cellular) communication network.

The central data governance server 108 may include one or more central processing units (CPUs) or processors 114 (may be called a microcontroller or a microprocessor), one or more memories 116, and a system bus (not shown) that couples various system components including the memory 116 to the processors 114. The system bus may include an Industry Standard Architecture (ISA) bus, a Micro Channel Architecture (MCA) bus, Enhanced ISA (EISA) bus, Video Electronics Standards Association (VESA) local bus, a Peripheral Component Interconnect (PCI) bus or a Mezzanine bus, and the Peripheral Component Interconnect Express (PCI-E) bus.

The memory 116 may include an assortment of computer-readable media, where computer-readable media may be any media that may be accessed by the central data governance server 108. By way of example, and not limitation, the media may include both transitory and non-transitory media, removable and non-removable media. For example, the memory 116 may include non-transitory media such as RAM, ROM, EEPROM, or other memory technology, optical storage disks, magnetic storage devices, and any other non-transitory medium which may be used to store computer-accessible information. In particular, the memory 116 may store one or more applications or modules including a deviation detection module 118, an action module 120, a data exclusion module 122, a data correction module 124, an enforcement analytics module 126, and a security module 129. Although each of the modules 118, 120, 122, 124, 126, and 129 are illustrated as separate modules stored in the memory 116, some implementations of the environment 100 may combine and/or separate the functionality of the modules 118, 120, 122, 124, 126, and 129 into any number of distinct modules, applications, etc.

The deviation detection module 118 may, when executed by the processors 114, detect deviations in the collections of data 110a-110p from guidelines, standards, and best practices. In some implementations, the deviation detection module 118 may detect deviations from guidelines, standards, and best practices based on a plurality of deviation detection scripts 128 stored in a governance database 130. For example, the deviation detection module 118 may "scan" each of the collections of data 110a-110p based on the data detection scripts 128 to identify portions of each of the collections of data 110a-110p that do or do not adhere to certain guidelines, standards, and best practices. The deviation detection scripts 128 may include Structure Query Language (SQL) scripts or scripts in any other suitable programming language. In some cases, the central data governance server 108 may retrieve one or more of the deviation detection scripts 128 for execution locally on the processors 114, and, in other cases, the central data governance server 108 may store at least some of the deviation detection scripts 128 in the memory 116 for quick retrieval.

Generally, the collections of data 110a-110p may include data stored on the data storage device 106 (e.g., including optical storage disks, magnetic storage devices, etc.) and queried from the data storage device 106 via any suitable data structure, format, protocols, languages, etc. For example, the collections of data 110a-110p may include structured data, semi-structured data, or unstructured data stored in relational databases, object-relational databases, hierarchical databases, document-oriented databases, etc. The central data governance server 108 may query, scan, or otherwise interact with the collections of data 110a-110p via languages, protocols, scripts, etc. defined according to database servers, applications, or systems such as the DB2® Database Software, Apache™ Hadoop® Software Framework, SQL Server® Relational Database Management System, Oracle® Database Object-Relational Database Management System, MongoDB® Document-Oriented Database System, etc. Additionally, the collections of data 110a-110p may include any suitable type of data such as insurance claim/policy data, user interaction data, website analytics data, customer contact data, mobile application data, product or service data, etc.

The action module 120, when executed by the processors 114, may automatically determine and complete appropriate actions (e.g., selected from a set of pre-defined actions) in response to a detection of a deviation from guidelines, standards, and best practices. Such actions may include, by way of example, communicating electronic or other notifications to the data services manager devices 102 and/or the database administrator devices 104, marking or indicating a wait or pending status of a portion of data, automatically altering portions of data (e.g., by the data correction module 124), generating an incident indication or report corresponding to a deviation, or taking no action. Such actions are further discussed with reference to FIG. 5.

In some scenarios in which the action module 120 determines that a communication should be sent to the data services manager devices 102 and/or the database administrator devices 104, the central data governance server 108 may send the communication to the data services manager devices 102 and/or the database administrator devices 104 via a network interface 132. Further, in some cases, communications generated by the action module 120 may include indications or descriptions of certain data standards, guidelines, or best practices that corresponding to a particular deviation. These indications or descriptions may be stored in one or more data standards/guidelines 134 in the governance database 130, for example.

The data exclusion module 122 of the central data governance server 108 may, when executed by the processors 114, generate exclusions for certain portions of the collections of data 110a-110p such that the certain portions of the collections of data 110a-110p are not subject to detections of deviations (e.g., by the deviation detection module 118) and/or regulatory actions in response to those deviations (e.g., generated by the action module 120). In an implementation, an operator of one of the data services manager devices 102 or the database administrator devices 104 may interact with the central data governance server 108 (e.g., via a web interface, terminal interface, or any other suitable interface) to request that an exclusion be made for certain portions of one of the collections of data 110a-110p. In one scenario, a deviation may be known to the operator, and the operator may be taking steps to correct the deviation. If approved (e.g., automatically by the data exclusion module 122 based on certain rules, security profiles, or manually via communications generated by the exclusion module 122), the data exclusion module 122 may store indications of one or more exclusions 136 in the governance database 130. Subsequently the deviation detection module 118 and/or action module 120 may query the exclusions 136 to determine if certain portions of the collections of data 110a-110p are to be scanned and/or if actions are to be taken with respect to deviations from standards, guidelines, and best practices.

The enforcement analytics module 126 may, when executed by the processors 114, track, monitor, and generate reports indicative of the governance of database, or other software, applications. The enforcement analytics module 126 may track, by way of example, numbers of incidents, numbers of deviations, communications sent to operators of the data services manager devices 102 or the database administrator devices 104, time required to correct deviations from guidelines, etc. Managers or business professionals may utilize such tracking information and/or scorecards, reports, or dashboards summarizing the tracking information (e.g., generated by the enforcement analytics module 126) to understand the benefit of certain standards/guidelines, the implementation process of certain standards, the cost of regulating the collections of data 110a-110p, the response of data administrators to actions corresponding to deviations, or any other suitable intelligence that may be of interest to business and/or technical management of an entity operating the system 100.

In particular, the enforcement analytics module 126 may generate (e.g., automatically or when prompted by one of the database services manager devices 102 or database administrator devices 104) a dashboard and a scorecard based on gathered tracking information, in an implementation. The dashboard may include one or more interactive web pages, reports, portals, etc. allowing operators of the data services manager devices 102 to view detailed information about the enforcement of standards by the central data governance server 108. For example, the dashboard may allow the operators of the data services manager devices 102 to view all deviations on all of the data collections 110a-110p along with associated information about the deviations and/or administrators of corresponding ones of the data collections 110a-100p, such information including types of deviations, timestamps of detections, database names, table names, file names, usernames, workgroup identifications, etc. Because such a dashboard may allow access to a large amount of information, the dashboard generated by the enforcement analytics module 126 may be configured to be filtered by the database services manager devices 102 or database administrator devices 104. That is, upon accessing the dashboard (e.g., via one or more web pages generated by the central data governance server), operators of the database services manager devices 102 or database administrator devices 104 may apply filters to the information available via the dashboard to view filtered dashboards. For example, certain operators may only wish to view deviations for a certain one of the data collections 110a-110p and, as such, may filter the dashboard to display deviations for only the certain one of the data collections 110a-110p. Another operator may only wish to view deviations within the last day, week, month, etc. and, as such, may filter the dashboard by time. Generally, a dashboard generated by the enforcement analytics module may be filtered according to any suitable parameter or parameters.

Also, the enforcement analytics module 126 may generate a scorecard allowing operators of the database services manager devices 102 or database administrator devices 104 to view more general information (than the information accessible via the dashboard) related to the enforcement of standards. For example, a scorecard may display one or more trends (e.g., deviations per day) of deviations across the data collections 110a-110p, trends for specific deviations (e.g., newly enforced deviations), and/or one or more scores, graphs, plots, or other numerical or visual elements allowing the operators to quickly assess the health, performance, or adherence to standards of the data collections 110a-110p. In this manner, operators may easily and quickly understand the general health and performance of data applications via the scorecard and, if they wish, view more detailed tracking or reporting information via the dashboard, in an implementation.

The security module 129 may, when executed by the processors 114, configure, modify, or query one or more security profiles 138 stored in the governance database 130. The security profiles 136 may indicate roles and permissions corresponding to operators of the data services manager devices 102 and the database administrator devices 104 (e.g., identified by usernames), and the security module 129 may query the security profiles 136 to authorize certain actions by the operators of the data services manager devices 102 and the database administrator devices 104. For example, one of the operators of the data services manager devices 102 and the database administrator devices 104 may request an exclusion, attempt to modify or add to the data standards guidelines 134, attempt to modify the deviation detection scripts 128, access certain information within a dashboard, etc., and the security module 129 may allow or deny these actions based on permissions (e.g., indicated in the security profiles 136) corresponding to the one of the operators of the data services manager devices 102 and the database administrator devices 104.

In an implementations, certain operators of the database services manager devices 102 or database administrator devices 104 may interact with the central data governance server (e.g., via a web browser, terminal, or other interface) to turn on or off certain functionalities of the central data governance server. That is, in an implementation, the various modules 118, 120, 122, 124, and 126 may implement functionalities, such as communication actions, altering actions, deviation detection actions, etc. that may be activated or deactivated (e.g., turned on/off) by certain operators. For example, certain operators of the database services manager devices 102 or database administrator devices 104 may be able to activate or deactivate deviation detection via the deviation detection module for some or all of the data storage devices 106a-106p (e.g., for those devices 106a-106p located in certain physical locations). In another example, certain operators may be able to activate or deactivate certain types of actions (e.g., a subset of available actions executable by the action module 120), such as email notifications, for some or all of the deviations detected on some or all of the data storage devices 106a-106p. Generally, any of the functionalities of the modules 118, 120, 122, 124, and 126 may be activated or deactivated for some or all of the data storage devices 106a-106p, for indefinite periods of time or for finite time periods, for some or all of the administrators (e.g., identified by username or workgroup) of the data collections 110a-110p, or based on any other suitable location, time, user, group, data type, etc. policy or combination of policies. Further, the security module 129 may only allow certain operators to activate or deactivate some or all of the configurable functionalities.

Although one central data governance server 108, one data storage device 106, and one governance database 130 is depicted in FIG. 1, some implementations of computing environment for automatic governance of databases may utilize different numbers of servers and data storage devices. In particular, the processing performed by the central data governance server 108 may be distributed among a plurality of servers in an arrangement known as "cloud computing," and the data stored in data storage device 106 and the governance database 130 may be distributed among a plurality of data storage devices, in an embodiment. This configuration may provide several advantages, such as, for example, enabling near real-time uploads and downloads of information as well as periodic uploads and downloads of information.

Guidelines, Standards, Best Practices, and Corresponding Scripts

FIG. 2 is a list of example best practices, guidelines, and standards 200 that may be enforced by a system, such as the system 100 illustrated in FIG. 1. The best practices, guidelines, and standards 200 are given by way of example, and it is understood that a system, such as the system 100, may govern databases and software applications based on any suitable best practices, guidelines and standards relevant to those data and applications. The example list of best practices, guidelines, and standards may be applicable to only certain types of systems (e.g., DB2® Database Software systems), but central data governance servers, such as the example central data governance server 108, may automatically regulate (e.g., enforce standards) for any suitable types of systems, as discussed further above.

Specifically, for the governance of collections of data, such as the collections of data 110a-110p, relevant guidelines, standards, and best practices may include guidelines, standards, and best practices related to: data modeling, storage systems, data types, table design, amounts of data stored, compression of data, indexing of tables, structure of databases, configuration logs, performance logs, performance monitoring and tuning, image copies of data, etc. For example, guidelines specific to a database or software application may include guidelines specifying that database administrators are to utilize data and index compression. In another example, based on guidelines and standards, database administrators may be required to limit tables to particular sizes (e.g., in terms of columns, rows, or data storage).

In some implementations, certain best practices, guidelines, and standards may be required while others may be optional. For example, the best practices, guidelines, and standards 200 may require that a database administrator maintains at least one image copy of stored data (e.g., for backup or recovery purposes), whereas it may only be recommended that database administrators utilize columns that best match most frequently used queries as index keys. As such, actions taken in response to deviations from each of these guidelines, regarding image copies and index keys, may differ. For example, one deviation (e.g., a lack of image copies) may trigger a notification to both database administrators and managers or supervisors including a due date for correction of the deviation. Another deviation (e.g., related to index keys) may only trigger a notification or recommendation to a database administrator. A range of actions in response to deviations is further discussed with reference to FIG. 5. In general, each type of deviation may trigger a different action (e.g., completed by the action module 120) based on the type of deviation, timing of the deviation, past instances of the deviation, identities of administrators corresponding to the data, etc.

In one implementation, a central data governance server 108 or governance database 130 may generate or store a threat or priority level corresponding to each guideline, or deviation from that guideline (e.g., in the action module 120 or in the data standards/guidelines 134). A central data governance server 108 may associate (e.g., by executing the deviation detection module 118 or the action module 120) any suitable number of threat levels with corresponding types of deviations from guidelines, standards, and best practices, such as those illustrated in FIG. 2. The central data governance server 108 may represent threat levels by a text, numerical, or symbolic indicator, such as "low," "medium," or "high" or via numbers ranging from one to ten with ten representing the highest threat level. Such threat levels may be manually programmed into the deviation detection module 118 or the action module 120 by an operator of one of the data services manager devices 102, for example.

To detect deviations from best practices, standards, and guidelines, such as the example best practices, guidelines, and standards 200, the deviation detection module 118 may execute the one or more deviation detection scripts 128 that query the collections of data 110a-110p. That is, each of the one or more deviation detection scripts 128 may be configured to scan data, retrieve information, locate documents, etc. so as to identify deviations from one or more of the best practices, guidelines, and standards 200. In some cases, each of the deviation detection scripts 128 may be configured to search for and identify a deviation from a particular one of the best practices, guidelines, and standards 200, and, in other cases, the deviation detection scripts 128 may include scripts that locate multiple different types of deviations.

The deviation detection scripts 128 may, by way of example, include Structured Query Language (SQL) elements (queries, statements, predicates, etc.), MapReduce programs, or any other piece of computer-readable instructions used to interact with the collections of data 110a-110p. In an implementation, operators of the data services manager devices 102 may upload new and/or different scripts into the deviation detection scripts 128 or may delete scripts from the deviation detection scripts 128. For example, when a particular guideline, standard, or best practice is revised, updated, deleted, or added to the best practices, guidelines, and standards 200, an operator of one of the data services manager devices 102 may revise, update, delete, or add one of the deviation detection scripts 128 corresponding to the particular guideline, standard, or best practice. In this manner, the deviation detection functionality of the central data governance server 108 may be easily updated or revised over time for all of the collections of data 110a-110p being monitored (without a need to update a deviation detection module for each of the collections of data 110a-110p).

Figure 3:
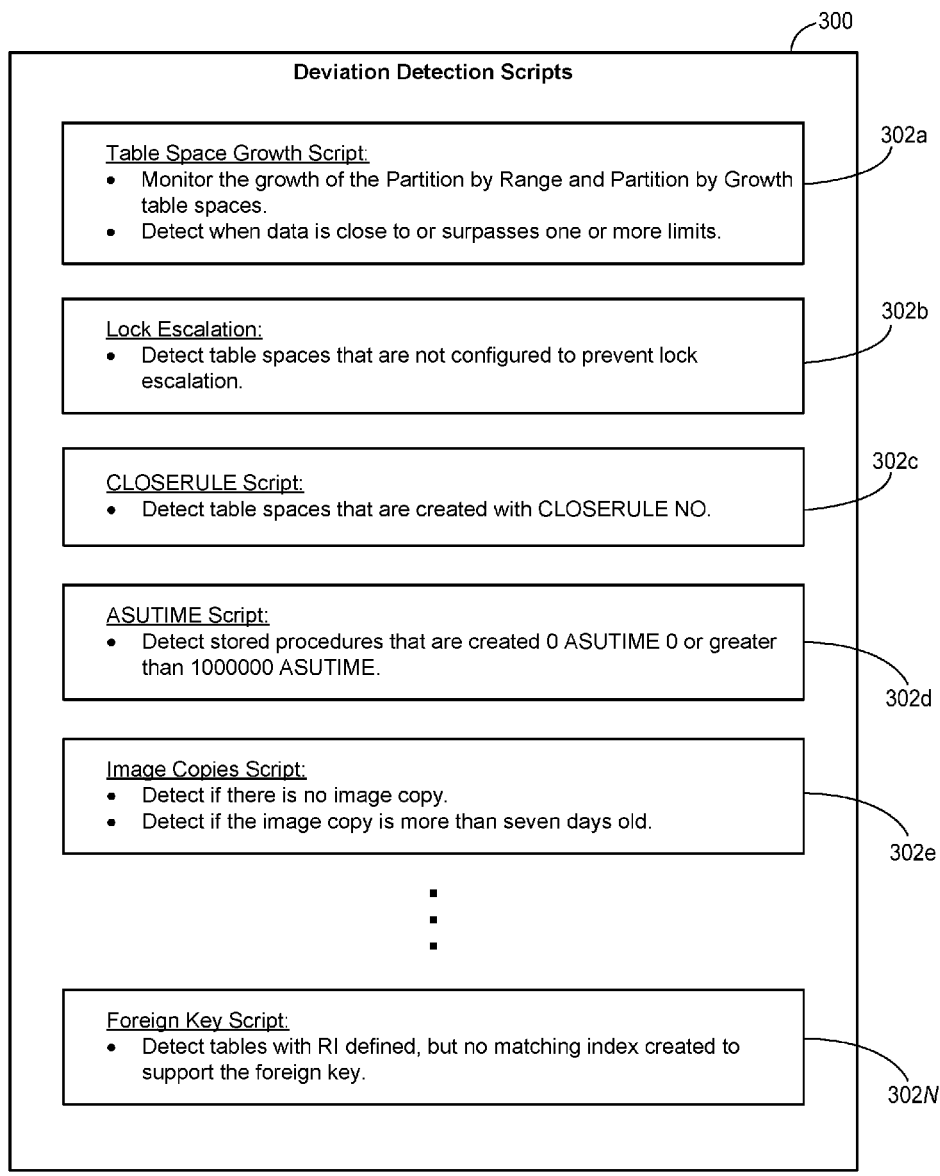
FIG. 3 is a block diagram of example deviation detection scripts which may be utilized in the computing environment illustrated in FIG. 1 to detect deviations from guidelines, standards, and best practices.

FIG. 3 is a block diagram of one or more example deviation detection scripts 300. The deviation detection scripts 300 may be utilized by the deviation detection module 118 to detect deviations from a plurality of guidelines, standards, and best practices, for example.

The example deviation detection scripts 300 include N scripts 302a-302N, where each of the scripts 302a-302N may detect one or more deviations from guidelines, standards, and best practices, such as the example best practices, guidelines, and standards 200. As discussed above, each of the scripts 302a-302N may be capable of detected a deviation from one particular guideline or from a plurality of guidelines. For example, the script 302a may monitor the growth of table spaces and detect when the size or amount of data is close to or surpasses one or more limits or thresholds. Another script 302e may detect both a lack of any image copy and an outdated image copy (e.g., created more than seven days prior to the execution of the script 302e).

In some implementations, each of the scripts 302a-302N may execute on one of the collections of data 110a-110p at a time, whereas, in other implementations, at least some of the scripts 302a-302N may execute on multiple of the collections of data 110a-110p simultaneously. Further, the central data governance server 108 may execute all of the scripts 302a-302N simultaneously or sequentially at periodic times (e.g., once a week), when triggered by one of the data services manager devices 102, or at any suitable non-periodic times (e.g., four time a month when network traffic is below a threshold). It is understood, however, that the central data governance server 108 may execute each of the scripts 302a-302N at any suitable time independent of other of the scripts 302a-302N, and the central data governance server 108 may execute all or some of the scripts 302a-302N on portions of one or more of the collections of data 110a-110p independently of other portions of the collections of data 110a-110p.

Governance Methods

Figure 4:
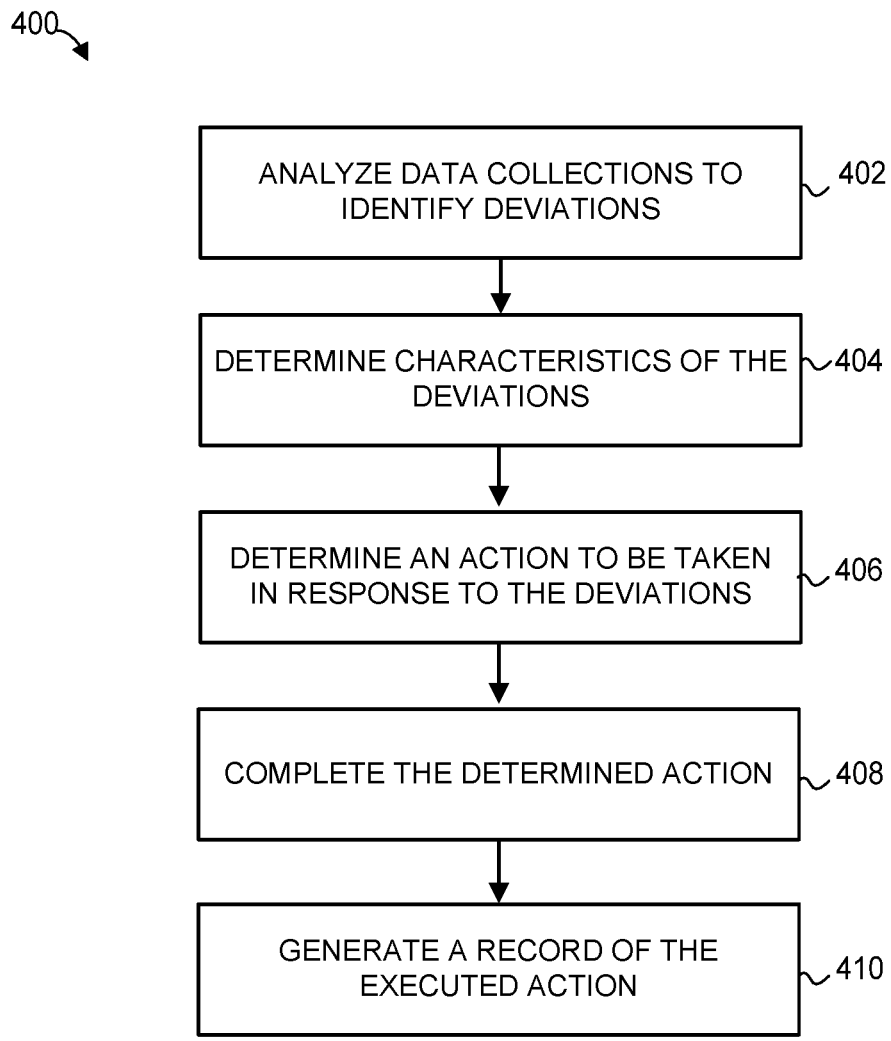
FIG. 4 is a flow diagram of an example method for automatically governing a plurality of collections of data which can be implemented in the computing environment illustrated in FIG. 1.

FIG. 4 is a flow diagram of an example method 400 for governing or regulating a plurality of collections of data, such as the collections of data 110a-110p. The method 400 may be implemented by the central data governance server 108, for example.

To begin, collections of data are analyzed, based on one or more deviation scripts, to identify deviations from guidelines, standards, and/or best practices (block 402). The central data governance server 108 may execute the deviation detection module 118 based on one or more scripts, such as the scripts described with reference to FIG. 3. The analysis of the collections of data may be automated or manually triggered. For example, the deviation detection module 118 may execute periodically (e.g., once per day) and/or may execute at any suitable time based on instructions received from one of the data services manager devices 102.

In some implementations, the deviation detection module 118 may, prior to analyzing the collections of data 110a-110p, determine if one or more portions of the collections of data 110a-110p are to be excluded from the analysis. For example, the deviation detection module 118 may retrieve current exclusions from the exclusions 136 and execute one or more of the deviation detections scripts 128 on only portions of the collections of data 110a-110p that are not indicated in the exclusions 136. Exclusions are further discussed with reference to FIG. 6.

Next, characteristics of the deviations are determined (block 404). The deviation detection module 118 or the action module 120 may determine characteristics of the detected deviations, such as a threat or priority levels, owners of (e.g., those responsible for) the collections of data in which deviation are detected, consequences of altering the detected deviations such that the corresponding data collection adhere to guidelines, numbers and times of past occurrences of the same deviations, etc. Generally, any suitable characteristics of the deviations may be determined such that actions may be taken in response to the deviations.

Based on the characteristics of the deviations, one or more actions to be taken in response to each of the deviations is determined (block 406). The action module 120 may utilize the characteristics to determine (when executed by the processors 114) an action corresponding to each of the detected deviations. In one scenario, the deviation detection module 118 may detect a lack of an image copy in a data collection with a high threat level, such as in a data collection supporting a highly visible customer-facing application. As such, the action module 120 may determine that an immediate alteration of the data should be completed to create an image copy and an incident report should be created noting the non-compliance of the owners of the corresponding data collection. In another example scenario, the deviation detection module 118 may detect a lack of an image copy with a low threat level, such as data not currently used in production applications. In this scenario, the action module 120 may determine that a notification should be sent to the owners of the corresponding data collection, but no incident report should be created.

Generally, an action module may determine any number and type of actions in response to a single deviation including sending of notifications (emails, text messages, mobile alerts, etc.), creating of incident reports, escalating incident reports, queuing a deviation for later action, taking no action, etc. Determining and completing actions in response to deviations is further discussed with reference to FIG. 5.

Returning to FIG. 4, the determined one or more actions to be taken in response to the deviations are completed. For example, the action module 120 in cooperation with other components of the central data governance server 108 (e.g., the network interface 132) may send emails if a notification action is determined, or the action module 120 may trigger the data correction module 124 to alter certain portions of the collections of data 110a-110p if an alteration action is determined.

Also, a record of the executed action is generated (block 410), in some implementations. For example, the enforcement analytics module may generate one or more records indicative of the actions taken in response to the detected deviations to track and measure the enforcement of guidelines, standards, and best practices. The generated record may include email identifications, timestamps, threat levels, indications of owners of collections of data, incident identification numbers, numbers of similar deviations, database indices, etc.

In some implementations, operators of the data services manager devices 102 and/or the database administrator devices 104 may interact with the enforcement analytics module 126 (e.g., send queries or request to the enforcement analytics module 126) to receive reports based on the records of executed actions. For example, business managers or information technology (IT) managers may query the enforcement analytics module 126 and, in response to the query, receive a report detailing numbers of actions per time (day, week, month, etc.), owners of collections of data with recent deviations, particular standards that are frequently broken, estimated costs due to deviations (e.g., based on downtime), etc.

Figure 5:
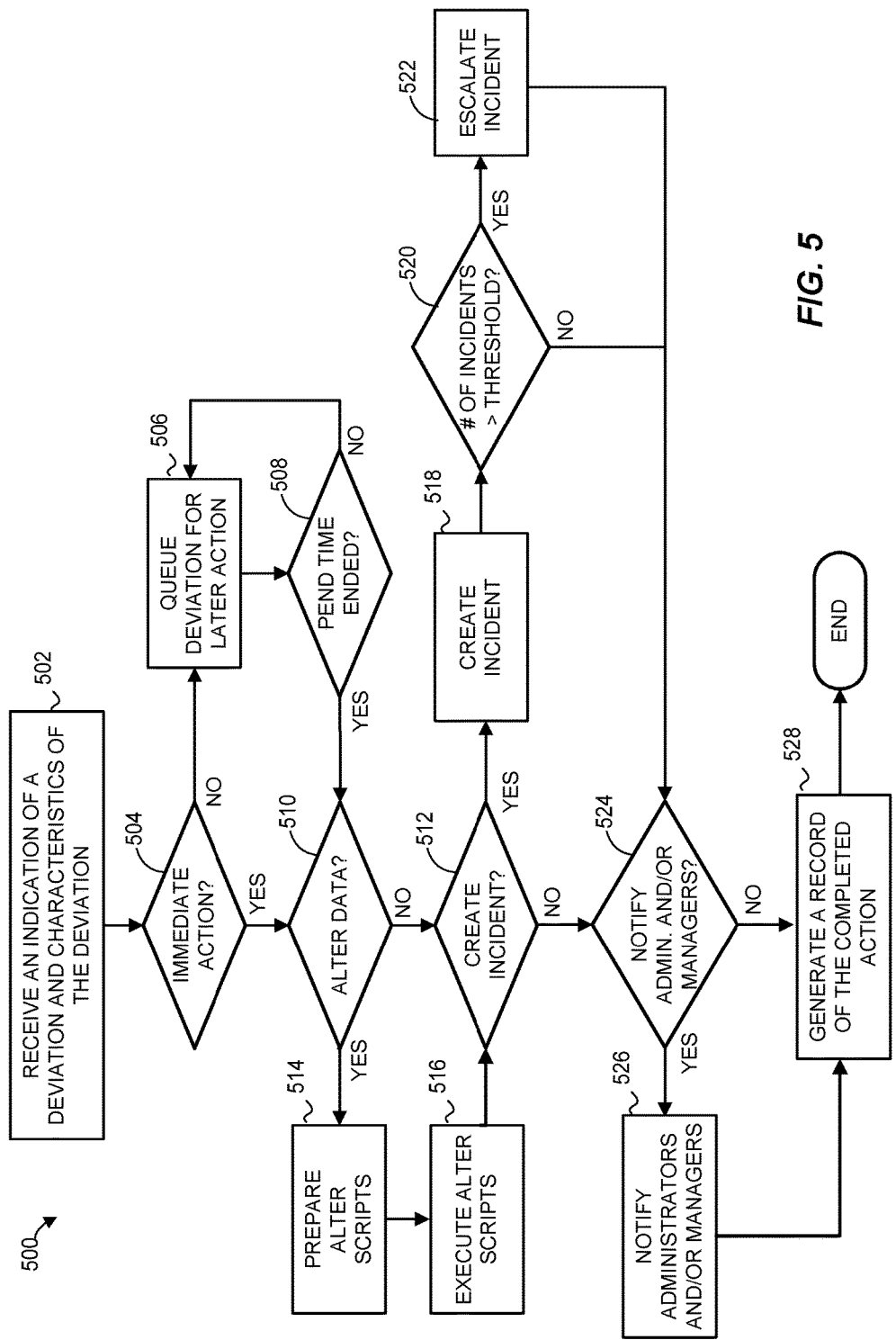
FIG. 5 is a flow diagram of an example method for completing actions in response to detected deviations which can be implemented in the computing environment illustrated in FIG. 1.

FIG. 5 is a flow diagram of an example method 500 for automatically completing actions in response to detect deviations from guidelines, standards, and best practices. The method 500 may be implemented by the central data governance server 108, for example.

First, an indication of a deviation and characteristics of that deviation are received or determined (block 502). The central data governance server 108 may generate the indication according to the method 400, for example. Next, it is determined if the deviation requires an immediate action (block 504). The action module 120 may, when executed by the processors 114, determine if the deviation requires an immediate action based on one or more of the characteristics of the deviation. For example, if the deviation has a corresponding low threat level or the deviation does not correspond to data utilized in current customer-facing applications, an action module 120 may determine that the deviation does not require an immediate action. On the other hand, if the deviation has a corresponding high threat level or the deviation corresponding to data of a certain type, the action module 120 may determine that immediate action is necessary. Generally, the action module 120 may have any number and type of programmed rules or algorithms that receive as input characteristics of a deviation and provide as output an indication of whether or not the deviation requires immediate action.

If it is determined that the deviation from guidelines, standards, or best practices does not require immediate action, the deviation may be queued for a later action (block 506). That is, the indication of the deviation may be marked, stored in a file recording pending deviations, or otherwise noted such that the determination of an action in response to the deviation is re-visited at a later time. In one implementation, an indication of the deviation along with a timestamp of the detection of the deviation may be stored in a file (e.g., in the governance database 130 or in the memory 116) indicative of the pending status of the deviation and, in some cases, other detected deviations having a pending status. The pending file may also indicate a pending time for which a determination of action (in response to the deviation) is to be suspended. When it is determined that a pending time for the deviation is ended (block 508), the flow continues to block 510.

It is then determined if the data to which the deviation corresponds should be automatically altered so as to comply with guidelines, standards, and best practices (block 510). Again, the action module 120 may make this determination based on the characteristics of the deviation. In particular, the action module may make this determination based on whether or not an alteration of the data corresponding to the deviation will likely have negative impacts on an application utilizing the data or the system as a whole.

For example, alterations of data such as modifying file names, indices, table structures, etc. will likely create problems in or even cause a complete failure of applications utilizing the data. As such, the action module 120 may determine that such an automatic alteration of data is not possible or preferred. In such a case, the flow may continue to block 512. On the other hand, some alterations of data, such as creating an image copy of the data, may not influence applications utilizing the data, and, in these or similar cases, the action module may determine that an automatic alteration in response to the deviation is acceptable.

If it is determined that an automatic alteration of the data is possible, preferred or acceptable, alter scripts may be generated (514) where the alter scripts, when executed by one or more processors, automatically alter the data corresponding to the deviation. The alter scripts may include SQL elements, MapReduce programs, or other code executable by the processors 114 to modify the collections of data 110a-110p such that they comply with guidelines, standards, and best practices. In some implementations, the action module 120, or other module or computer-readable medium, may store templates for alter scripts, where each template corresponds to particular alterations. When executed, the action module 120 may utilize these templates along with the specific characteristics of the deviation (locations with a data collection, file names, owner names, authentications, etc.) to generate the alter scripts. In some cases, multiple alter scripts may be required to correct a single deviation, but any number (one, two, three, etc.) of alter scripts may be utilized to modify collections of data such that they adhere to guidelines, standards, and best practices. The alter scripts may then be executed to correct the detected deviation (block 516).

Returning to block 512, it is also determined if an incident, or incident report, is to be created as a result of the deviation from guidelines, standards, or best practices. An incident, or incident report, may include any number of communications, reports, write-ups, tickets, records, etc. that are made known to parties other than the owners of data to which the deviation corresponds. For example, an incident may include the creation of a report or ticket indicative of an owner of data deviating from best practices, and the report or ticket may be communicated to or accessible by supervisors or managers of the owner of the data deviating from best practices. In this manner, owners of data (e.g., in the collections of data 110a-110p) may be professionally motivated to avoid deviations from best practices, guidelines, and standards such that supervisors and managers are not made aware of their deviations.

In some implementations, incidents or incident reports may only be generated for deviations with certain characteristics. For example, if deviations are of a high threat level, the action module 120 may determine that an incident is to be generated. Or if deviations occur in data used for customer-facing applications, the action module 120 may determine that an incident is to be generated. If such an incident is to be generated, the flow continues to block 518 where the incident is generated. In some cases, the action module 120 may notify managers or supervisors of the generated incident at block 518, and in other cases, the action module 120 may generate a file or other record indicative of the incident for later notification or viewing (e.g., via communications from the central data governance server 108 to the data services manager devices 102).

In some implementations, it may be determined if a number of similar or other incidents corresponding to a collection of data or owner of a collection of data (in which the deviation is detected) is greater than a threshold (block 520). The action module 120 may query a database, such as the governance database 130, in which incidents are recorded to determine if an owner of the deviating data is associated with one or more previously generated incidents. For example, the action module 120 may determine that a particular owner of data has three past incidents indicating a failure to create image copies or that a particular owner of data has five incidents related to table spaces created without CLOSERULE NO. In these cases, the action module 120 may determine if the number of incidents is great than a threshold value, and, if so, escalate an incident (block 522).

By way of example and without limitation, escalating an incident may include: (i) communicating with, notifying, generating reports for or otherwise interacting with managers, supervisors, or other individuals who would not be communicated with, notified, have reports generated for, or otherwise be interacted with for a non-escalated incident; (ii) limiting the permissions of one or more owners of collections of data such that the owners do not have access to, cannot modify, or cannot otherwise interact with certain collections of data, systems, or applications; or (iii) disabling certain applications or systems that utilize the data that is not compliant with guidelines, standards, and best practices. The action module 120 may complete any combination of these or other escalations when numbers of incidents are greater than thresholds. In some implementations, the action module 120 may utilize multiple different escalations when numbers of incidents become greater than multiple different thresholds. For example, when an owner of a data collection fails to create an image copy three times, certain managers or supervisors may be notified of the deviation. When the owner of the data collection fails to create an image copy a total of five times, the action module 120 may automatically limit the permissions of the owner.

Returning to FIG. 5, even if an incident is not generated or escalated and data is not altered, it may be determined that certain administrators, owners, or managers are to be notified of the deviation from guidelines, standards, and best practices (block 524). For example, the central data governance server 108 may automatically notify one or more of the operators of the data services manager devices 102 and/or the database administrator devices 104 via an email, text message (e.g., short message service or multimedia messaging service message), mobile alert (e.g., push access protocol message), web page, phone call, etc. sent to the corresponding one or more of the data services manager devices 102 and/or the database administrator devices 104 (e.g., via the network 112). Generally, a data governance server may utilize any suitable type or combination of electronic or other communications to notify owners of collections of data, managers, supervisors, IT professionals, etc. of a deviation from guidelines, standards, and best practices.

In some implementations, the central data governance server 108 may notify owners of a data collection or managers with both an indication of a deviation and an indication of one or more characteristics of the deviation. For example, the central data governance server 108 may send the owner of a data collection an email detailing the time at which a deviation was detected, a location of the deviation within the data collection, the type of deviation (lack of image copy, data size surpassing a limit, etc.), recommended steps to correct the deviation, contact information of individuals who can answer questions regarding the deviation, due dates for correcting the deviation, locations of scripts that may be executed to correct the deviation, threat levels, warnings regarding consequences of not correcting the deviation, time at which data was automatically altered, etc.

After actions have been taken in response to the deviation, a record of the completed action(s) may be generated (block 528). The enforcement analytics module 126 may generate a record, such as a database record in the governance database 130, a temporary record in the non-transitory memory 116, or any other suitable record which stored an indication of the completed actions. Similar to the notifications discussed with reference to block 526, stored records may indicate one or more characteristics corresponding to the deviation. In some implementations, the enforcement analytics module 126 may include various routines or algorithms that may satisfy requests for reports corresponding to past deviations or derived metrics from the records. For example, business manager may send a request to the central data governance server 108 (e.g., via one of the data services manager devices 102), and, in response to the request, receive web pages, dashboards, reports (e.g., documents), graphs, plots, tables, spreadsheets, etc. generated by the enforcement analytics module based on the records of prior deviations. In this way managers, or other individuals, may track the enforcement, implementation, and monitoring of guidelines, best practices, and standards.

Figure 6:
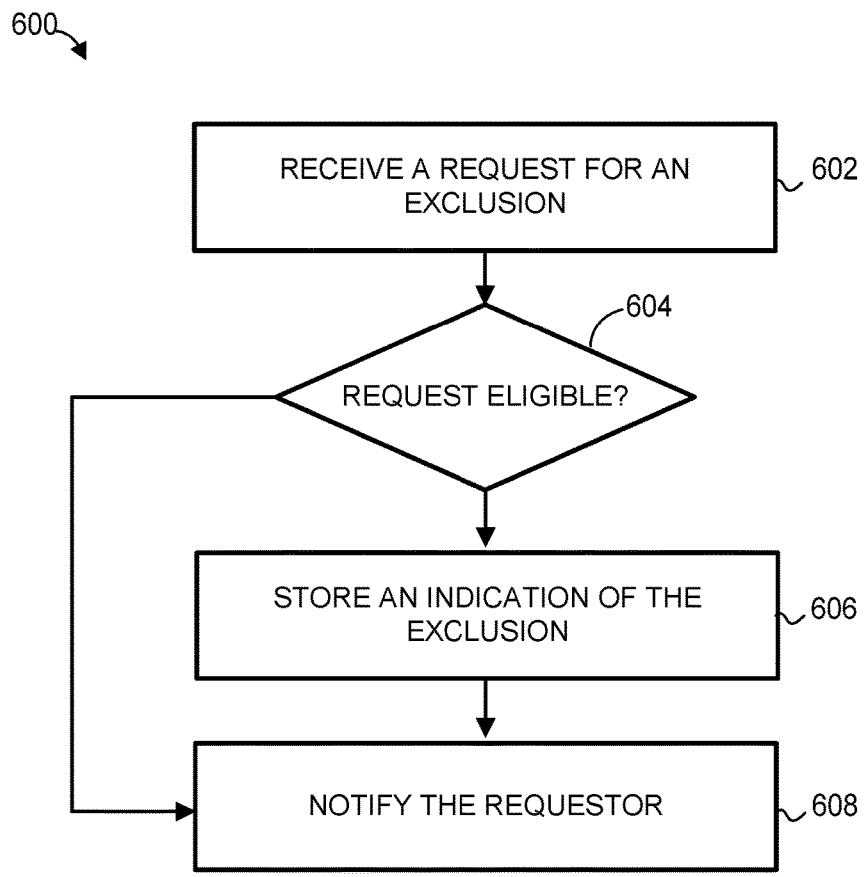
FIG. 6 is a flow diagram of an example method for generating exclusion data which can be implemented in the computing environment illustrated in FIG. 1.

FIG. 6 is a flow diagram of an example method 600 for excluding portions of data from a detection of deviations or from actions (e.g., regulatory actions such as notification, creation of incidents, etc.) taken in response to deviations. The example method 600 may be implemented by the central data governance server 108, for example.

To begin, a request for an exclusion is received (block 602). The central data governance server 108 (or the data exclusion module 122, in particular) may receive a request from one of the database administrator devices 104, for example. The request may be formatted according to any suitable format and protocol, such as an email message, a text or configuration file, an automatically generated message from a web-based portal or web page, etc. The request for an exclusion may indicate portions of data via file names, database names, locations within databases, owner names (e.g., usernames), passwords, etc. and reasons for the request for exclusion. The request may also indicate an amount of time for which the exclusion is requested (e.g., days, weeks, months, etc.).

An owner of a data collection may be aware of a deviation within the data collection and may need time to correct the deviation, for example. In such a case, further notifications, incidents, etc. may be avoided via an exclusion. In another cases, owners of collections of data may be performing approved tests or research on a data collection that will produce known deviations. The owners may request an exclusion for the collection of data to avoid confusing notifications or unnecessary alterations of the data collection. In some implementations, a request for exclusion may include one or more keywords, codes, or other indications of one or more pre-defined exclusion conditions such as "known issue," "approved testing," etc. For example, an operator of one of the data administrator devices 104 may access a web portal or other web page and select keywords or codes from a drop down menu or other form element to generate a request for exclusion.

Next, it is determined if portions of data indicated in the request for exclusion are eligible for the requested exclusion (block 604). The central data governance server 108 may, in some implementations, automatically determine eligibility based on reasons for exclusion included in a request (e.g., keywords or codes), identities or permissions of owners of the portions of data indicated in the request (e.g., indicated in the security profiles 138), and prior exclusions requested for the portions of data indicated in the request. For example, certain owners of collections of data or certain portions of data may only be eligible for exclusions lasting a certain amount of time (e.g., a week). This eligibility may provide opportunities for owners to correct deviations and prevents granted exclusions for infinite periods of time. Also, certain portions of data may be ineligible for exclusions, such as data currently be utilized by customer-facing applications in which a certain level of data availability is required.

In some cases, the eligibility of exclusions may be manually determined by operators of the data services manager devices 102. For example, when the data exclusion module 122 receives a request for exclusion, the data exclusion module may notify one or more operators of the data services manager devices 102 (e.g., via email). Subsequently, the operator of the data services manager device 102 may communicate with the central data governance server 108, via a web, terminal, or other interface, to grant or deny the requested exclusion.

If the request for exclusion is determined to be ineligible the flow continues to block 608. Otherwise, the flow continues to block 606 where an indication of the exclusion is stored. The data exclusion module 122 may store the indication of the exclusion in a database, such as in the exclusions 136 in the governance database 130. The data exclusion module 122 may notify the requester of the exclusion that the requested exclusion has been granted or that the requested exclusion has been rejected (e.g., because of ineligibility).

Additional Considerations

Upon reading this disclosure, those of ordinary skill in the art will appreciate still additional alternative structural and functional designs for system and a method for automatic governance of data or software applications. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention. By way of example, and not limitation, the present disclosure contemplates at least the following aspects:

1. A computer-implemented method for regulating collections of data, the computer-implemented method comprising:

for each of a plurality of collections of data:

analyzing, by one or more processors, the collection of data to identify one or more deviations in the collection of data from a standard governing the plurality of collections of data;

automatically determining, by the one or more processors, a characteristic of the one or more deviations indicating at least one of:

(i) a similarity of the one or more deviations to a past deviation in the collection of data from the standard governing the plurality of collections of data, (ii) a consequence of altering the collection of data to correct the one or more deviations, or (iii) a threat level corresponding to the one or more deviations;

based on the characteristic of the one or more deviations, automatically determining, by the one or more processors, an action to be taken in response to the one or more deviations;

executing, by the one or more processors, the action to be taken in response to the one or more deviations; and generating, by the one or more processors, a record of the executed action to be stored on a computer-readable medium.

2. The computer-implemented method according to aspect 1, wherein automatically determining the characteristic of the one or more deviations includes determining the characteristic of the one or more deviations indicating at least two of:

(i) a similarity of the one or more deviations to a past deviation in the collection of data from the standard governing the plurality of collections of data, (ii) a consequence of altering the collection of data to correct the one or more deviations, or (iii) a threat level corresponding to the one or more deviations.

3. The computer-implemented method according to either aspect 1 or aspect 2, wherein automatically determining the action to be taken in response to the one or more deviations includes determining to automatically alter the collection of data such that the collection of data complies with the standard governing the plurality of collections of data.

4. The computer-implemented method according to any one of the preceding aspects, wherein automatically determining the action to be taken in response to the one or more deviations includes determining to automatically notify one or more of a plurality of data administrators responsible for the collection of data about the one or more deviations.

5. The computer-implemented method according to any one of the preceding aspects, wherein automatically determining the action to be taken in response to the one or more deviations includes determining that an incident should be generated corresponding to the collection of data.

6. The computer-implemented method according to any one of the preceding aspects, wherein automatically determining the action to be taken in response to the one or more deviations includes determining that the incident should be escalated based on a plurality of previously generated incidents corresponding to the collection of data.

7. The computer-implemented method according to any one of the preceding aspects, wherein the plurality of collections of data is a first plurality of collections of data, the method further comprising:

determining, by the one or more processors, the first plurality of collections of data and a second plurality of collections of data, wherein the second plurality of collections of data are to be excluded from a detection of deviations from the standard governing the plurality of collections of data based on stored exclusions corresponding to the second plurality of collections of data, and wherein the first plurality of collections of data is to be included in the detection of deviations from the standard governing the plurality of collections of data.

8. The computer-implemented method according to any one of the preceding aspects, wherein analyzing the collection of data to identify the one or more deviations in the collection of data from the standard governing the plurality of collections of data includes:
retrieving a plurality of deviation detection scripts, and
executing each of the plurality of deviation detection scripts on the collection of data.

9. The computer-implemented method according to any one of the preceding aspects, wherein the plurality of data collections is a first plurality of data collections, the method further comprising:
determining, by the one or more processors, the first plurality of data collections from a second plurality of data collections based on an activation of a deviation detection for only the first plurality of data collections, wherein the second plurality of data collections includes the first plurality of data collections and other data collections.

10. The computer-implemented method according to any one of the preceding aspects, wherein the first plurality of data collections are stored on first data storage devices at a first physical location, wherein the other data collections are stored on a second data storage device at a second physical location different from the first physical location, and wherein the activation of the deviation detection activates the deviation detection for only the first plurality of data collections stored on the first data storage devices at the first physical location.

11. The computer-implemented method according to any one of the preceding aspects, wherein automatically determining the action to be taken in response to the one or more deviations includes selecting the action from a set of pre-defined actions.

12. The computer-implemented method according to any one of the preceding aspects, wherein selecting the action from the set of pre-defined actions includes:
identifying a subset of activated actions from the set of pre-defined actions, and selecting one of the subset of activated actions.

13. A computer-implemented method for regulating a collection of data administered by one or more data administrators, the computer-implemented method comprising:
receiving, via the computer network, a request for exclusion of a first portion of the collection of data from the regulatory actions, the first portion of the collection of data different than a second portion of the collection of data;
based on the received request, determining, by the one or more processors, that the first portion of the collection of data is eligible to be excluded from the regulatory actions and the second portion of the collection of data is subject to the regulatory action;
for the second portion of the collection of data:
analyzing, by one or more processors, the second portion of the collection of data to identify one or more deviations in the second portion of the collection of data from a standard governing the collection of data;
automatically determining, by the one or more processors, a characteristic of the one or more deviations indicating at least one of:
(i) a similarity of the one or more deviations to a past deviation in the collection of data from the standard governing the plurality of collections of data,
(ii) a consequence of altering the collection of data to correct the one or more deviations, or
(iii) a threat level corresponding to the one or more deviations;
based on the characteristic of the one or more deviations, automatically determining, by the one or more processors, an action to be taken in response to the one or more deviations; and
executing, by the one or more processors, the action to be taken in response to the one or more deviations.

14. The computer-implemented method according to aspect 13, further comprising:
generating, by the one or more processors, exclusion data indicating that the first portion of the collection of data is to be excluded from the regulatory actions for a specific length of time.

15. The computer-implemented method according to either aspect 13 or aspect 14, further comprising notifying, via the computer network, the one or more data administrators that the first portion of the collection of data is to be excluded from the regulatory actions for the specific length of time;

16. The computer-implemented method according to any one of aspects 13 to 15, further comprising:
receiving, via the computer network, a second request for exclusion of the second portion of the collection of data from the regulatory actions,
wherein determining that the second portion of the collection of data is subject to the regulatory actions includes determining that the second request is invalid.

17. The computer-implemented method according to any one of aspects 13 to 16, wherein the second request is received from a particular one of the one or more data administrators, and wherein determining that the second request is invalid includes determining that the second request is invalid based on a security profile associated with the particular one of the one or more data administrators.

18. The computer-implemented method according to any one of aspects 13 to 17, wherein the determined action includes generating an incident report based on the one or more deviations for presentation to at least one of managers or supervisors of the one or more data administrators.

19. The computer-implemented method according to any one of aspects 13 to 18, wherein the determined action includes notifying the one or more data administrators about the one or more deviations with an email notification.

20. A system comprising:
one or more processors; and
a non-transitory computer-readable medium storing instructions thereon that, when executed by the one or more processors, cause the system to:
for each of the plurality of collections of data:
analyze the collection of data to identify one or more deviations in the collection of data from a standard governing the plurality of collections of data,
determine a characteristic of the one or more deviations indicating at least one of:
(i) a similarity of the one or more deviations to a past deviation in the collection of data from the standard governing the plurality of collections of data,
(ii) a consequence of altering the collection of data to correct the one or more deviations, or
(iii) a threat level corresponding to the one or more deviations;
based on the characteristic of the one or more deviations, determine an action to be taken in response to the one or more deviations;
complete the action to be taken in response to the one or more deviations; and generate a record of the executed action to be stored on a computer-readable medium.

21. The system according to aspect 20, wherein, for at least some of the plurality of collection of data, the action includes at least two or more of
(i) notifying one or more data administrators responsible for the collection of data about the one or more deviations,
(ii) generating an incident report corresponding to the one or more deviations, or
(iii) automatically altering the collection of data such that the collection of data complies with the standard governing the plurality of collections of data.

22. The system according to either aspect 20 or aspect 21, wherein the one or more deviations include at least one of a failure to create an image copy or a failure to properly structure at least portions of a database.

We claim:

1. A computer-implemented method for regulating collections of data, the computer-implemented method comprising, for each of a plurality of collections of data:
analyzing, by one or more processors executing a plurality of deviation detection scripts, the collection of data to identify one or more deviations corresponding to ways in which the collection of data deviates from a standard governing the plurality of collections of data, wherein analyzing the collection of data to identify one or more deviations includes at least one of (i) detecting that an amount of data associated with a table space in the collection of data surpasses a threshold, (ii) detecting that data within the collection of data lacks an image copy, (iii) detecting that data within the collection of data is associated with an outdated image copy, or (iv) detecting that index keys associated with data within the collection are non-matching to a set of most frequently used queries;
automatically determining, by the one or more processors, a characteristic of the one or more deviations based upon at least one of:
(i) a similarity of the one or more deviations to a past deviation of the collection of data from the standard governing the plurality of collections of data,
(ii) a consequence of altering the collection of data to correct the one or more deviations, or
(iii) a threat level corresponding to the one or more deviations;
based upon the characteristic of the one or more deviations, automatically determining, by the one or more processors, an action to correct the one or more deviations, wherein the action to correct the one or more deviations includes an alteration of the collection of data;
causing, by the one or more processors, execution of the action to correct the one or more deviations, the action to correct the one or more deviations including the alteration of the collection of data; and
generating, by the one or more processors, a record of the executed action to correct the one or more deviations.

2. The computer-implemented method of claim 1, wherein automatically determining the characteristic of the one or more deviations includes determining the characteristic of the one or more deviations based upon at least two of:
(i) a similarity of the one or more deviations to a past deviation in the collection of data from the standard governing the plurality of collections of data,
(ii) a consequence of altering the collection of data to correct the one or more deviations, or
(iii) a threat level corresponding to the one or more deviations.

3. The computer-implemented method of claim 1, wherein causing execution of the action to correct the one or more deviations further includes automatically notifying one or more of a plurality of data administrators responsible for the collection of data about the one or more deviations.

4. The computer-implemented method of claim 1, wherein causing execution of the action to correct the one or more deviations further includes causing the incident report to be escalated based on a plurality of previously generated incidents corresponding to the collection of data.

5. The computer-implemented method of claim 1, wherein the plurality of collections of data is a first plurality of collections of data, and wherein the method further comprises:
determining, by the one or more processors and based on stored exclusions corresponding to a second plurality of collections of data, that the second plurality of collections of data is to be excluded from a detection of deviations from the standard governing the plurality of collections of data.

6. The computer-implemented method of claim 1, wherein automatically determining the action to correct the one or more deviations includes selecting the action to correct the one or more deviations from a set of pre-defined actions.

7. The computer-implemented method of claim 6, wherein selecting the action from the set of pre-defined actions includes:
identifying a subset of activated actions from the set of pre-defined actions; and
selecting one of the subset of activated actions.

8. A system comprising:
one or more processors; and
a non-transitory computer-readable medium storing thereon instructions executable by the one or more processors, the executed instructions causing the system to, for each of the plurality of collections of data:
analyze, by executing a plurality of deviation detection scripts, the collection of data to identify one or more deviations corresponding to ways in which the collection of data deviates from a standard governing the plurality of collections of data, at least by one or more of (i) detecting that an amount of data associated with a table space in the collection of data surpasses a threshold, (ii) detecting that data within the collection of data lacks an image copy, (iii) detecting that data within the collection of data is associated with an outdated image copy, or (iii) detecting that index keys associated with data within the collection are non-matching to a set of most frequently used queries;
determine a characteristic of the one or more deviations based upon at least one of:
(i) a similarity of the one or more deviations to a past deviation in the collection of data from the standard governing the plurality of collections of data,
(ii) a consequence of altering the collection of data to correct the one or more deviations, or
(iii) a threat level corresponding to the one or more deviations;
based on the characteristic of the one or more deviations, determine an action to correct the one or more deviations, wherein the action to correct the one or more deviations includes an alteration of the collection of data;

cause execution of the action to correct the one or more deviations, the action to correct the one or more deviations including the alteration of the collection of data; and generate a record of the executed action to correct the one or more deviations.

9. The system of claim 8, wherein the action to correct the one or more deviations further includes automatically notifying one or more of a plurality of data administrators responsible for the collection of data about the one or more deviations.

10. The system of claim 8, wherein the action to correct the one or more deviations further includes escalating the incident report based on a plurality of previously generated incidents corresponding to the collection of data.

11. The system of claim 8, wherein the plurality of collections of data is a first plurality of collections of data, and wherein the instructions executable by the one or more processors further cause the system to:

determine, based upon stored exclusions corresponding to a second plurality of collections of data, that the second plurality of collections of data is to be excluded from a detection of deviations from the standard governing the plurality of collections of data.

12. A non-transitory, computer-readable medium storing instructions executable by one or more processors, the executed instructions causing the one or more processors to, for each of a plurality of collections of data:

analyze, by executing a plurality of deviation detection scripts, the collection of data to identify one or more deviations corresponding to ways in which the collection of data deviates from a standard governing the plurality of collections of data, at least by one or more of (i) detecting that an amount of data associated with a table space in the collection of data surpasses a threshold, (ii) detecting that data within the collection of data lacks an image copy, (iii) detecting that data within the collection of data is associated with an outdated image copy, or (iv) detecting that index keys associated with data within the collection are non-matching to a set of most frequently used queries;

determine a characteristic of the one or more deviations based upon at least one of:
  (i) a similarity of the one or more deviations to a past deviation in the collection of data from the standard governing the plurality of collections of data,
  (ii) a consequence of altering the collection of data to correct the one or more deviations, or
  (iii) a threat level corresponding to the one or more deviations;

based on the characteristic of the one or more deviations, determine an action to correct the one or more deviations, wherein the action to correct the one or more deviations includes an alteration of the collection of data; and cause execution of the action to correct the one or more deviations, including the alteration of the collection of data; and generate a record of the executed action to correct the one or more deviations.

13. The non-transitory, computer-readable medium of claim 12, wherein the action to correct the one or more deviations further includes automatically notifying one or more of a plurality of data administrators responsible for the collection of data about the one or more deviations.

\* \* \* \* \*